March 28, 1950     F. X. LAMB     2,502,160
FILAR GEARING
Filed Oct. 1, 1946
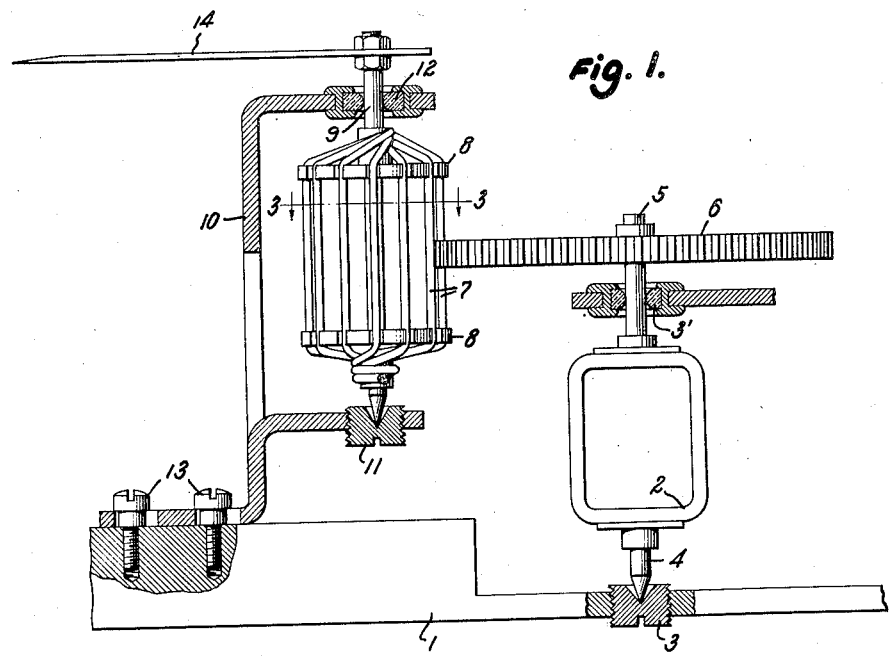
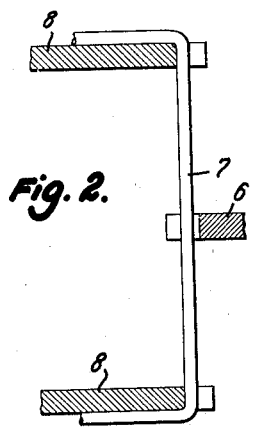
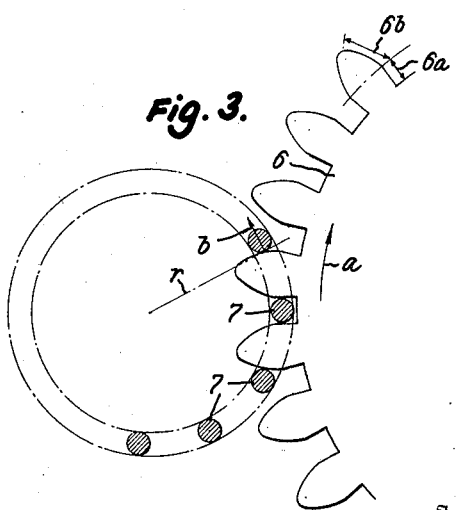
Inventor:
Francis X. Lamb.
By Pierce, Scheffler & Parker.
Attorneys.

Patented Mar. 28, 1950

2,502,160

UNITED STATES PATENT OFFICE 2,502,160

FILAR GEARING

Francis X. Lamb, East Orange, N. J., assignor to Weston Electrical Instrument Corporation, Newark, N. J., a corporation of New Jersey Application October 1, 1946, Serial No. 700,574

5 Claims. (Cl. 74—461)

This invention relates to filar gearing for transmitting angular motion without appreciable free play or backlash, and particularly to gearing adapted for use in sensitive measuring instruments or other devices that develop relatively minute operating forces.

Filar gearing of this type is described and claimed in my prior Patent No. 2,313,444, and comprises a rigid gear in mesh with a filar gear having longitudinally resilient filamentary tooth elements. As set forth in that patent, a typical filar gear for multiplying the angular displacement of the moving system of a sensitive electrical measuring instrument may have tooth elements of nylon thread of a diameter of 0.0017 inch and a length of 0.60 inch on a pitch diameter of 0.15 inch. The rigid spur gear had rounded teeth with root sections conforming to the cross-section of the filamentary tooth elements, and the gear could be adjusted to a negative clearance as the filamentary tooth elements were transversely deformable. Another prior patent, No. 2,313,445, relates particularly to mechanical constructions that facilitate the accurate manufacture of the small filar gears and that preclude a "jump" of the meshing gears on sudden accelerations of either the filar gear or the spur gear.

One of the objects of this invention is to provide an improved construction for gearing of the type described in which anti-jump flanges described in my prior Patent No. 2,313,445 may now be eliminated altogether. These flanges were formerly considered desirable as a safeguard against any "jump" or slipping action of the meshing gears when the filar gearing was to be used in applications where high shock accelerations might be imposed upon either the filar or its mated spur gear.

Another object is to provide an improved type filar gearing by which one may maintain a more precise control over the final diameter of the strands or "teeth" of the filar gear. This makes it possible to more accurately mesh the gears with a minimum amount of clearance or backlash which results in a very low factor of scale error when the gearing is used to multiply the angular displacement of a moving system of a sensitive measuring instrument.

Yet another object is to provide a lighter weight filar gearing than has heretofore been possible, and this of particular advantage in instrument applications since it reduces the total weight of the pivoted system of the instrument and correspondingly improves its sensitivity.

Still another object of the invention is to provide an improved filar gearing in which the design requirements for radial spacing of the filar tooth elements are made less exacting.

More specifically, another object is to provide a gearing of the type including a filar gear with longitudinal resilient tooth elements and a meshing spur gear with tooth elements having curved faces and flat flanks that preclude a "jump" or slip of the gearing under shock accelerations.

These and other objects and advantages of the invention will be apparent from the following specification when taken with the accompanying drawing in which:

Fig. 1 is an enlarged and somewhat schematic side elevation, with parts in section, of a measuring instrument that includes a motion-multiplying filar gearing embodying the invention;

Fig. 2 is a fragmentary side elevation, on an enlarged scale, of a filar tooth element and the spur gear; and Fig. 3 is a fragmenary sectional view, as seen on the plane of line 3—3 of Fig. 1, of the meshing gears.

In Figs. 1 and 2 of the drawings, the reference numeral 1 identifies the base or sub-base of an electrical measuring instrument having a moving system comprising a coil 2 that is pivotally supported in jewel bearing 3, 3' by a pivot 4 and staff 5, respectively. The particular construction of the instrument, or other device, with which the novel gearing is to be used forms no part of the present invention and, for simplicity, the full structure of the instrument is not illustrated in Fig. 1.

The filar gearing comprises a rigid spur gear 6 on the staff 5, and a driven gear formed by a cylindrical array of taut, longitudinally resilient filaments 7 that extend between and have their ends rigidly supported by a pair of axially spaced disks or radial flanges 8 on the staff 9. It is to be noted that the thickness of the filaments is not shown to scale in the drawings as the diameter of a filament is only a minute fraction of its length. The filaments 7 constitute the tooth elements of the driven gear, and they may be threads of silk or plastic materials, natural or synthetic bristles, wires or strands of any elastic material capable of slight transverse bending and adapted to be cemented or otherwise secured to the disks or flanges 8. The essential requirement is that each filamentary tooth element must be longitudinally resilient throughout the small range of stretching to which it is subjected as a result of the slight transverse deflection of the central portion of the tooth element as it moves into and out of engagement with the driver gear 6. The filar teeth may be formed by winding a long strand in notched edges of the disks 8, Figs. 1 and 2, or by securing individual filaments in openings at the edges of the disks. The staff 9 is rotatably mounted on a bracket member 10 by jewel bearings 11, 12, and the bracket member is secured in desired adjustment on the base member 1 by studs 13. The staff 9 carries a pointer 14 that moves along a scale, not shown, and the design of the gearing may be such that the pointer 14 is rotated through 360° or more by the angular displacement of the moving system of the instrument.

In the arrangement shown in my prior Patent No. 2,313,444, the rigid spur gear had rounded teeth with root sections conforming to the circular cross-section of the filamentary tooth elements of the filar gear, and preferably the normal undeformed pitch diameter circle of the filar gear overlapped the root diameter circle of the rigid spur gear by an amount designated "x" in Fig. 3 of that patent to constitute a "negative" clearance. With such an arrangement, a considerable amount of lateral deflection was required of the strands or "teeth" of the filar gear. As this deflection was obtained by a longitudinal stretching, the elastic strands were required to be of considerable length as compared with the diameter of the filar gear.

The new and improved filar gearing according to this invention differs from that shown in my previous patent in that the teeth of the rigid gear 6 are not generally shaped to conform to the circular cross-section of the filamentary teeth 7 on the filar gear but are deeply cut, preferably with parallel sides, so as to leave a small clearance between the filamentary teeth 7 and the roots of the teeth on the rigid spur gear 6, and another small clearance between the filar tooth elements 7 and the sides of the parallel walls of the spur gear teeth.

Referring now to Fig. 3, it is seen that the faces 6a of the root sections of the teeth of the spur gear 6 are parallel from the root circle to the pitch circle. The guide sections 6b of the spur gear teeth outwardly from the pitch circle are of convolute or approximately convolute form for smooth sliding contact with the filaments 7 as the latter move into and out of engagement with the flat faces 6a of the spur gear teeth. The engagement between the filaments 7 and the spur gear is limited to substantially line contact at elements of the cylindrical filaments 7 which pass through the pitch circle, the contact being at one side or the other of the filaments depending upon the direction of rotation of the spur gear 6.

A slight clearance or backlash is established between the parallel walls 6a and the filar teeth 7. This clearance although substantial in comparison to the diameter of the filar teeth, is of small absolute value and as will be explained in more detail later can be accurately controlled. In the case of a minute filar gear for use in a measuring instrument, this clearance may be of the order of 0.001 inch when using a filament strand of 0.0020 inch diameter (in the unstretched condition) for the filar teeth 7. A clearance of this order can be tolerated in precision instruments as the free play or backlash results in an error of only .05 of 1% of full scale reading.

A slight clearance of the order of a few thousandths of an inch is also preferably established between the filamentary teeth 7 and the roots of the teeth of the spur gear 6 to compensate for any slight variation in the radial positions of the several filaments 7 that may occur during manufacture.

A sudden or shock acceleration of the spur gear 6, for example clockwise as indicated by the arrow a in Fig. 3, will impress forces on the engaged filaments 7 at their lines of contact with the spur gear. These forces, indicated by the arrow b, are substantially normal to the radii r from the axis of the filar gear to contact lines and have only negligible radial components that would tend to force the filaments radially. All tendency towards a "jump" or slipping of the gears is thus eliminated by so shaping the rigid spur gear that it contacts only the pitch circle elements of the filaments 7 of the filar gear.

Thus with the new gearing it is now no longer necessary to include the anti-jump flanges described in my prior Patent No. 2,133,445 which were formerly considered essential when the gearing was to be used under conditions in which substantially high shock accelerations might be imposed upon either the filar or its companion spur gear.

The fact that the filar gearing may now be safely operated with a "positive" clearance under all conditions as distinguished from the normal "negative" clearance arrangement in my prior patents results in several additional advantages. In the first place it reduces the amount by which the strands 7 of the filar gear are required to stretch as they move into and out of engagement with the teeth of spur gear 6. This is obvious for with "positive" clearance, but very little deformation of the strands 7 in a lateral direction is now required whereas in my prior patent, the strands 7 because of the "negative" clearance must stretch considerably as the strands come into and out of engagement with the teeth on the mated spur gear.

Since lateral resilience of the strands 7 is no longer of prime importance, the axial spacing between the flanges 8 of the filar gear may be made considerably less than was possible in the gearing shown in my prior Patent 2,313,444. In that patent, it was explained that when the "teeth" of the filar gear were constituted by strands of nylon having a diameter of .0017 inch after being wound, a distance of 0.60 inch between flanges 8 was necessary to permit the required lateral deflection of the strands. However, I have found that with my new gearing, it is now practical to reduce the distance between flanges 8 to about 0.10 or 0.20 of an inch, using strands of the same diameter and the same diameter of end flanges 8. Thus by materially reducing the length of the filar gear, each strand filament 7 while still having some resilience is able to withstand a much greater lateral force before it can be displaced in an amount sufficient to permit it to jump over to the next tooth of the rigid spur gear. Also since the filament strands 7 no longer are required to stretch materially, it now becomes practical to wind on the strands 7 with a greater tension and wider latitude in the tension, than was possible with the construction shown in my previous patent which thereby increases the tautness of the strands and further reduces the possibility of jump.

The fact that the tension of the strands 7 may now be varied appreciably without regard to the factor of lateral displacement, makes it possible to exercise a more precise control over the final diameter of the strands 7 so that the desired clearance between the strands and the parallel wall portions 6a of the teeth of the rigid spur gear may be accurately established. In other words, the diameter of the strand 7 may be varied by varying the tautness so that suitable matching with a minimum degree of backlash is achieved between the filar and spur gears when assembling the gearing. Thus should a final diameter of 0.0017 inch be desired for the filar teeth 7, a nylon or other filament having a diameter of about 0.002 inch, in an unstretched condition, may be wound upon the filar gear base flanges 8, the tension on the strands being so regulated that the strand is stretched until its diameter between the flanges 8 is reduced exacly to the desired value. It will be understood that whereas the stretching may be accomplished in winding a long strand upon the flanges 8 of the filar gear, it may also be done, when individual filar teeth are cemented to the discs or flanges, prior to setting the teeth in place upon the filar gear frame.

Another important advantage which results from the improved gear lies in the fact that since the filar gear is now required to be only approximately one fifth as long as the gear shown in my prior Patent 2,313,444, and hence it is now no longer necessary to use the safety flanges shown in my Patent 2,313,445 to prevent slippage of the gear in the case of suddenly applied acceleration forces, the mass of the filar gear is materially reduced thereby resulting in a substantial reduction of the total weight of the pivoted system of the instrument which results in a corresponding increase in its sensitivity.

In conclusion, it should now be apparent that the new gearing offers many advantages over the gearing shown in my prior two patents.

As to the shape of the teeth of spur gear 6, it will be apparent that it is not necessary to form the root sections of the spur gear 6 with flat faces 6a as the curved surfaces 6b may be extended inwardly to the root circle which, as stated above, is of such diameter as to avoid contact with the outer edges of the filaments 7. The form of the spur gear teeth may be altered materially from the illustrated shape without giving rise to radial forces on the filamentary tooth elements of such magnitude as to result in a jump or slipping of the meshed gears.

I claim:
1. A filar gearing comprising a filar gear with taut and longitudinally resilient filamentary tooth elements, and a cooperating spur gear with teeth having curved outer sections and flat inner sections shaped and arranged to limit contact with said resilient tooth elements substantially to tangential engagement along lines extending longitudinally of the tooth elements at the pitch circle radius of the filar gear.

2. A filar gearing as recited in claim 1, wherein the opposed flat inner sections of the spur gear teeth are spaced apart a distance in excess of the thickness of the filamentary tooth elements.

3. A filar gearing comprising a filar gear with longitudinally resilient and taut filamentary tooth elements of circular cross-section, and a cooperating spur gear with rectangular form teeth having flank surfaces substantially parallel and spaced apart by a distance in excess of the diameter of the filamentary tooth elements.

4. A filar gearing as recited in claim 3, wherein the axes of the filar gear and the spur gear are spaced apart to provide a positive clearance.

5. A filar gearing comprising a filar gear with longitudinally resilient filamentary tooth elements of circular cross-section, the axial length of said tooth elements being of the order of their pitch diameter, and a cooperating spur gear with teeth having opposed faces spaced apart by a distance approximating 150% of the thickness of the filamentary tooth elements of the filar gear.

FRANCIS X. LAMB.

REFERENCES CITED

The following references are of record in the file of this patent:

UNITED STATES PATENTS

| Number | Name | Date |
| --- | --- | --- |
| 312,663 | Schickle | Feb. 24, 1885 |
| 2,307,886 | Hansson | Jan. 12, 1943 |
| 2,313,444 | Lamb | Mar. 9, 1943 |
| 2,313,445 | Lamb | Mar. 9, 1943 |

FOREIGN PATENTS

| Number | Country | Date |
| --- | --- | --- |
| 182,999 | Switzerland | July 1, 1936 |